Jan. 1, 1963 J. SURES 3,070,893

METHOD AND APPARATUS FOR ELIMINATING OPTICAL REGISTRATION OF CHASE OR NEGATIVE CARRIER OF STEP-AND-REPEAT PHOTOCOMPOSING MACHINE

Filed Nov. 1, 1960 3 Sheets-Sheet 1

INVENTOR

Joseph Sures

BY Lawrence I. Field
William Grolman

ATTORNEY

INVENTOR
Joseph Sures
BY Lawrence I Field
William Grobman
ATTORNEY

Jan. 1, 1963 J. SURES 3,070,893

METHOD AND APPARATUS FOR ELIMINATING OPTICAL REGISTRATION OF CHASE OR NEGATIVE CARRIER OF STEP-AND-REPEAT PHOTOCOMPOSING MACHINE

Filed Nov. 1, 1960 3 Sheets-Sheet 3

INVENTOR

Joseph Sures

BY Lawrence I. Field
William Frobman

ATTORNEY 3,070,893

METHOD AND APPARATUS FOR ELIMINATING OPTICAL REGISTRATION OF CHASE OR NEGATIVE CARRIER OF STEP-AND-REPEAT PHOTOCOMPOSING MACHINE

Joseph Sures, 855 Fairway Drive, Miami Beach, Fla.

Filed Nov. 1, 1960, Ser. No. 66,453
6 Claims. (Cl. 33—184.5)

This invention relates to a method and apparatus which eliminates the need to optically register the negatives or positives, whether stripped to a masking sheet or not, as they are set in a chase or negative holder of a step-and-repeat photocomposing machine.

Step-and-repeat photocomposing machines are widely used in present day graphic arts. The purpose of a step-and-repeat photocompositor is to move a negative or a positive piece of film and to duplicate it in perfect registry in a plurality of different positions on a lithographic printing plate. In the case of four-color process work, the image is broken down into four colors and four negatives or positives are made, each corresponding to a single color. For high production, it is necessary to duplicate these negatives or positives, each color at a time, duplicated many times over, on a plate for each color and for reasons of economy, a photocompositor is used. Two of the well-known machines currently used are the Lanston and the Rutherford types. Both are vertical machines having a base from which a pair of vertical columns extend upwardly for the support and accurate guidance and positioning of a flat, vertically disposed carriage upon which there is mounted a chase, or negative holder, e.g. as described in Gutzmer Patent 2,886,894.

This invention is related to the precise manner in which each of the negatives or positives, whether stripped to a masking sheet or not, are located in the chase of the photocompositor in registry to other negatives or positives of a group.

In the present practice, as described, for example in the Gutzmer Patent 2,886,894, the negative holder is removed from the photocompositor, is placed on a layout table or glass top stripping table (the term given to a light table on which negatives for lithography are positioned) and the negative, which is one of a group that match, is positioned by eye by aligning a crosshair on the film to a fine line blue-keyed to the glass of the negative holder. This is very difficult to accomplish and ordinarily requires the use of a special registration device to align these negatives in registry to one another. In actual practice, a lithographic operator or stripper, as he is called, can register the images on the negatives to each other with ease compared to the effort required to register hairlines to one another. Because of parallax, hairlines located in spaced planes are much less readily matched than the entire images. In placing these negatives in the chase for example in a four color job requiring four lithographic plates and four negatives, each negative or color is registered in position in the chase at a different time. Indeed the critical weakness, if any, in present photocomposing machines is that although the chase or negative carrier will transport each of a set of negatives to an accurately predetermined location in the machine, it is essential that the negative be precisely and accurately placed on the negative holder by a craftsman relying on his eyesight to position one hairline on the negative over another on the registering device and then registering the negative with the chase. After this the chase or negative holder is transported to the machine wherein it is received in a suitable mounting. Since the registering together of these negatives is at four separate times as the four colors are individually being worked, and since the negatives are not registered to each other, but rather with the chase, the possibility of error in the positioning of the negatives for each color is inherent, with the consequent lack of registration of the colors in the final product. Furthermore the presently practiced method requires the operator to repeatedly shuttle the heavy (approximately 60 pound) negative holder between the photocomposing machine and a separate registration device located some distance from the photocomposing machine.

The registering of these crosshairs in the chase is time consuming and very difficult to accomplish and entails considerable possibility of error. Furthermore, with present equipment, this can only be done just prior to exposing the negative in the device.

Therefore, it is one object of this invention to effect the registration of negatives for various colors in perfect position relative to each other on a stripping table rather than in the chase itself and to effect said registration whether or not the negatives are mounted on a masking sheet or negative carrier.

Another object of the invention is to eliminate completely the need for registration devices now provided by the manufacturers of step-and-repeat photocomposing equipment, and the necessity for carrying a heavy chase to and from such a registration device.

It is a further object of this invention to accomplish this in such a way that to adapt this invention to machines currently in use will only require a suitable modification of the glass in the chase or negative holder and will not entail any other alteration in the mechanism of the photocompositor.

It is a principal object of the invention to eliminate the optical positioning of negatives in a negative holder.

It is a particular object of the invention to eliminate the necessity to remove the negative holder from the photocomposing machine in order to place negatives thereon, on photocomposing machines having a negative holder which may be tilted toward the operator.

These and other objects of the invention are accomplished by the use of the apparatus shown in the accompanying drawings in which—

Figure 1:
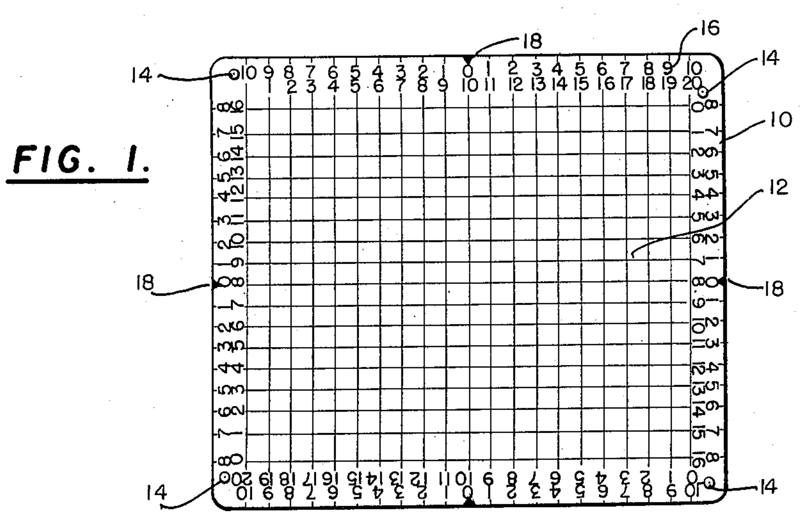
FIGURE 1 is plan view of a cross ruled plate used to support and to precisely register a plurality of negatives, relative to one another.

As shown in FIGURE 1 the apparatus includes a flat plate-like member 10 made of a sheet of glass or clear plastic and having on its surface a grid 12 of cross ruled lines, spaced from one another by any suitable amount and extending at right angles to one another. Plate-like member 10 may be permanently mounted on a light-table or it may be portable and separate from the table. Raised pins 14 extend upwardly from each of the four corners of the member 10. Along the margins of the plate-like member, suitable scales 16 are provided identifying the lines in the grid 12 and the mid-point of each margin is identified by a darkened arrowhead 18. The pins 14 it should be noted are not placed symmetrically about a central axis extending perpendicularly through the intersection of the diagonals drawn between the corners of the member 10, but are each offset from the corners of the sheet by a significantly different amount, so that sheets punched with holes corresponding to the positions of pins 14 may only be placed on the pins when oriented in a single way.

Figure 2:
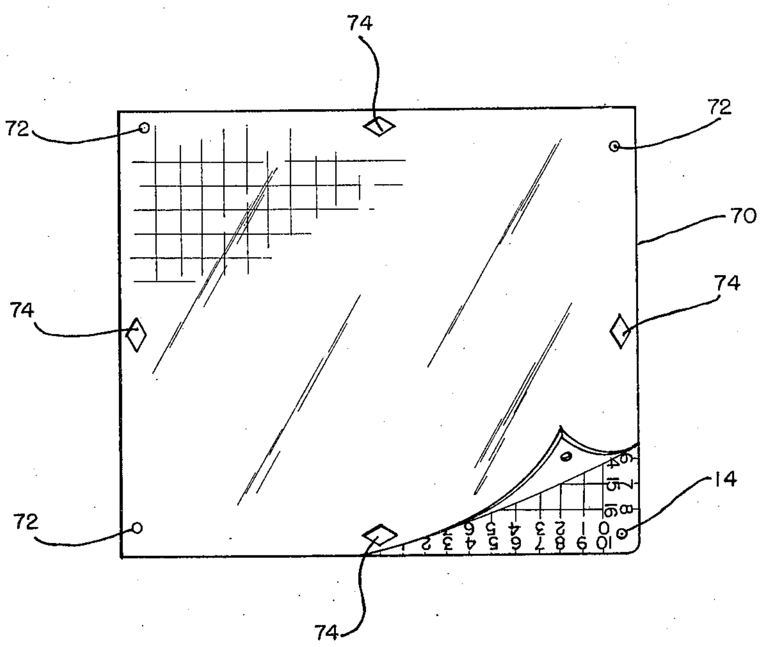
FIGURE 2 is a plan view of a masking sheet adapted to be used with the plate of FIGURE 1.

FIGURE 2 shows a masking sheet 70 being positioned on the plate 10 of FIGURE 1. Sheet 70 is formed of a dimensionally stable opaque material, i.e. a material the dimensions of which are not changed appreciably by ordinary variations in temperature or humidity. One suitable group of materials are the synthetic resins. Masking sheet 70 is punched with four holes 72 matching with pins 14 on sheet 10. In addition masking sheet 70 is provided with four diamond shaped openings 74 for use with tape to fix sheet 70.

Figure 3:
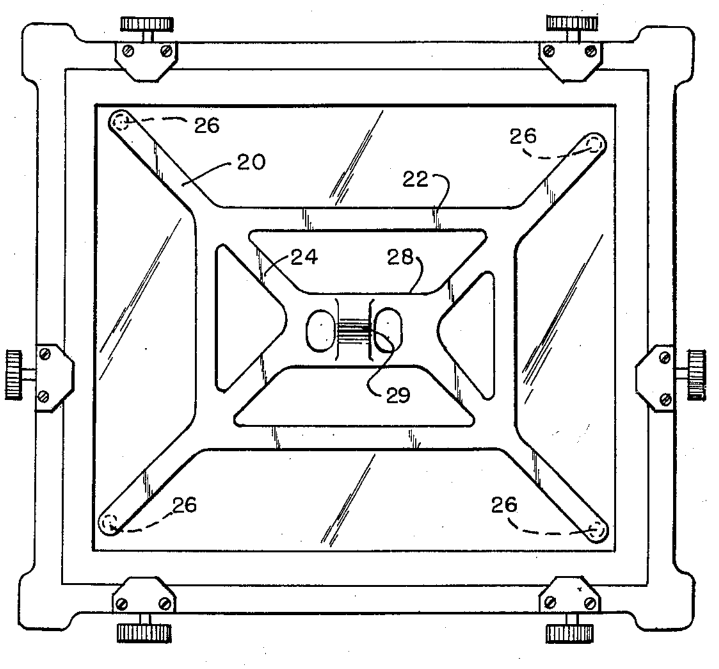
FIGURE 3 is a view of a metal holder or carrier for transferring negatives or positives from the support of FIGURE 1 to the chase of a photocomposing machine, shown in outline below the carrier.

FIGURE 3 shows a metal carrier 20 used to transfer a negative or positive after it has been positioned on the pins 14 of member 10 in registry with another negative or postive. Carrier 20 transfers the negative or positive from the device of FIGURE 1 to the chase or negative holder of a photocomposing machine, the chase being modified in the manner shown in FIGURE 4.

Figure 4:
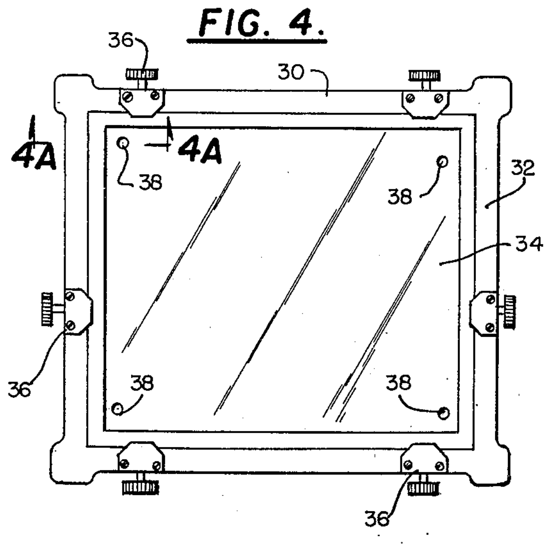
FIGURE 4 is a schematic front view of a chase or negative holder showing the manner in which the glass plate is modified to receive the carrier of FIGURE 3 or 5.

FIGURE 4 schematically shows the manner in which a chase or negative holder now used in photocomposing machines may be modified in order to practice the present invention. Chase 30 comprises a frame 32 disposed about a glass plate 34. Glass plate 34 is locked fast in the frame 32 by means of adjusting screws 36 which would not be required if the glass 34 was made integral with and immovable relative to frame 32. To adapt the negative holder shown to the present invention, four round holes 38 are drilled in the front of the glass in non-functional areas. Preferably the holes are about ¼ inch in diameter at the front surface of the glass and penetrate half the thickness of the glass, with a taper of about 0.001 inch in each ⅛ inch of depth. The holes 38 match and are adapted to receive corresponding pins 26 in the carrier plate shown in FIGURE 3.

Returning now to carrier 20 shown in FIGURE 3, it will be seen that the carrier comprises a generally rectangular frame portion having four sides 22, and four arm portions 24 which extend along the diagonals of the rectangle formed by sides 22 and the ends of which constitute prolongations of the arms past the perimeter of the frame. Adjacent the terminal portion of each of the arms is a pin or peg 26 each of which is a tapered male counterpart of the holes 38 drilled partially through glass plate 34. The inner ends of the arms 24 are joined by four short stiffening ribs 28 defining a smaller rectangle within the frame. A raised handle 29 extending transversely of the smaller rectangle serves as a means to convey carrier 20 in order to transport the holder or carrier 20 back and forth between the glass plate of FIGURE 1 and the chase of FIGURE 3. When pins 26 have been inserted in drilled holes 38, the carrier 20 serves to hold the negative or positive in place while it is being taped to the chase.

Figure 5:
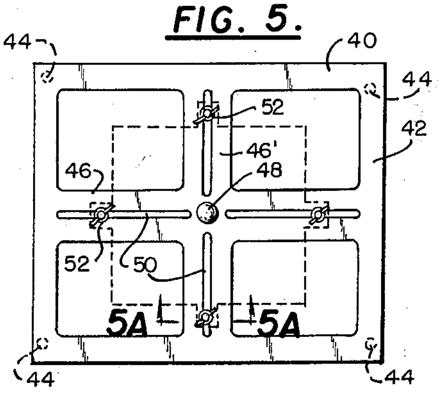
FIGURE 5 is a view of similar to FIGURE 3 but of a modification of a metal holder or carrier, particularly for use without a masking sheet.
Figure 4A:
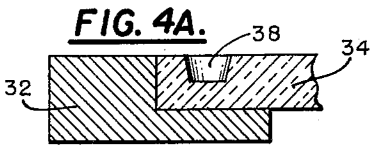
FIGURE 4A is a fragmentary section on plane 4A—4A of FIGURE 4.

FIGURE 5 shows another form of holder 40 or carrier used to transport negatives to the chase. In the embodiment there depicted, the holder consists of a generally rectangular frame 42, each of the four corners of which carries a tapered pin 44, located offset to the corner and otherwise identical with pins 26. A pair of crossed arms 46 and 46′ extend across the frame 42 parallel to both sides thereof. At the point at which arms 46 and 46′ intersect, a knob-type handle 48 is secured to the two arms.

Figure 5A:
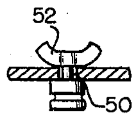
FIGURE 5A is a fragmentary view showing the shape of the movable pins on the holder of FIGURE 5 taken on plane 5A—5A.

Track-defining slots 50, extending along the centerlines of each of arms 46 and 46′ for a limited distance, are provided to receive pins or buttons 52, shown in detail in FIGURE 5A. Pins 52 are slidable in slots 50 and may be locked in place by conventional locking means (not shown) when the negative is properly registered. These inside pins are movable to accommodate the variations in the size of the negatives or positives to be used. In some instances these pins will be spring-loaded to bias them towards their respective corners to keep the negative taut prior to locking pins 52 in position.

Figure 6:
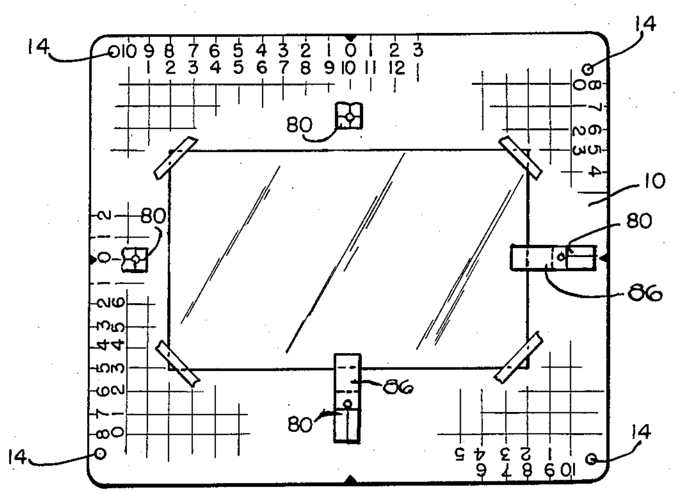
FIGURE 6 shows one manner in which negatives are accurately positioned without the use of a masking sheet.

FIGURE 6 illustrates one manner in which negatives or positives are located accurately without the use of a masking sheet. The first negative is placed centrally on a ruled surface such as plate 10, and is temporarily held in position by four bits of tape applied across the corners of the negative. To locate the negative in registration with other negatives of the series, four step-and-repeat pins 80, and four tabs 86, shown in greater detail in FIGURES 7 and 8, respectively, are used as will be later described. Pins 80 as commonly used each consist of a plastic flat sheet having a circular raised portion 82 and two scribed crosshairs 84 which intersect in the center of the raised portion. The tabs 86 comprise thin flexible plastic pieces having cut-away circular portions 88 which are adapted to snap onto and be seated on the raised portion 82 of the step-and-repeat pin 80.

MODE OF OPERATING

(a) *Device of FIGURES 1–4*

The operator first places the cross ruled glass plate 10 of FIGURE 1 on top of a horizontal light table. Plate 10 has an upstanding pin at each corner. As shown in FIGURE 2, a masking sheet, prepunched to fit onto the corner pins 14, is placed on the ruled glass member. Using the grid lines as a guide the first negative (first color worked) is stripped onto the masking sheet while the latter is held firmly in place by the corner pins, that is, the negative is affixed to the masking sheet by strips of tape. Hence, the term "stripped." After the negative has been taped to the first masking sheet, a window is cut in the masking sheet, the same size as the negative. Then a second masking sheet is placed over pins 14 so as to overlie the first masking sheet and negative. The second negative is then placed on the second masking sheet and is registered precisely by eye, by matching the images. Then the second negative is taped onto the second masking sheet, and the second masking sheet is removed and cut out. This sequence is repeated for each negative or positive until an entire set has been prepared, e.g. one corresponding to each color to be run.

Then the masking sheets, each bearing a negative, are positioned, preferably one at a time on the stainless steel holder of FIGURE 3 which has four corner pins 26 corresponding to the pins 14 on the plate 10. It will be noted that the one or more masking sheets each with a negative mounted thereon can be placed on the holder or carrier 20 at any time and stored while awaiting transfer to the modified chase or negative holder of FIGURE 4, having pin-receiving recesses 38. Upon positioning corner pins 26 in drilled holes 38, the operator affixes tape to the four diamond shaped openings in the outermost masking sheet, thus affixing that masking sheet and the negative thereon to the chase. When the operator removes holder 20 from the sockets 38, this masking sheet is left in position on the chase. In actual practice, the process was carried out on a photocomposing machine whereon the negative holder was one which tilted from the frame, and the carrier was brought into juxtaposition while the chase was merely tilted from the upright position.

The process was repeated for each color in sequence and as shown by the finished work, each succeeding negative had been properly registered with reference to the other negatives of the set, without resort to optical registry on the photocomposing machine.

*(b) Device of FIGURES 5–8*

The method of this invention may also be practiced without employing masking sheets.

Figure 7A:
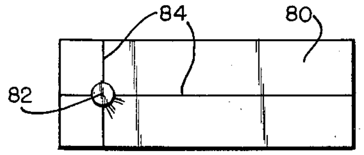
FIGURES 7A and 7B are respectively a plan view and side elevation of a step-and-repeat pin.
Figure 7B:
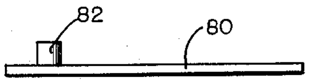
Figure 8:
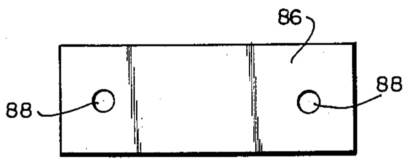
FIGURE 8 shows a tab suitable for use with the pin of FIGURES 7A and 7B.

To accomplish this the operator first places the first negative on the crossruled glass or plastic member 10, using the ruled centerlines for positioning the negative, e.g. as shown in FIGURE 6. He now places four step-and-repeat pins such as are shown in FIGURE 7 in position on the glass, one inch out from the edges of the negative, dead center to the negative on its four sides. He then tapes these pins down to the crossruled glass plate 10. Next he places tabs such as shown in FIGURE 8 on all four pins and tapes them to the negative. This pinning and taping replaces presently practiced inserting hairlines and taping them onto the negative. If desired, the negative could be punched out in order to affix the pins instead of using the tabs.

He takes the second negative of the set and registers it to the first, affixes tabs onto the same pins, and tapes the tabs to the second negative.

If four colors are involved he repeats the process on the third and fourth negatives.

The tabbed negatives are then removed from the plate 10 and placed on the pins 52 of the metal carrier 40.

The metal carrier 40 holding the negatives is now taken over to the negative holder of the step-and-repeat machine. The four fixed pins 44 of the carrier are inserted in the holes 38 in the negative carrier glass in the same manner as pins 26 of carrier 20 had been. As described above they will only fit when properly oriented. Where the carrier positions the first negative, it is taped in place (the method used presently for holding the negative in the negative holder). The carrier is removed and the first negative is in place in the negative holder. The first plate is made. The first negative is removed and the metal carrier will, by repeating the process, position the second, third and fourth negatives, in exact registry to each other, without optically registering the negatives in the negative carrier.

It will be evident that many immaterial changes may be made in the invention without departing from the spirit of the invention. Thus other step-and-repeat pins may be substituted for those described above, masking sheets 70 may have other than diamond-shaped openings 74 for facilitating taping of the masking sheet onto the chase, and other changes of a similar nature will be evident to others skilled in the art.

Having described my invention in accordance with the patent statutes, what I desire to claim is:

1. The method of mounting a series of related image bearing sheets in the chase of a step-and-repeat photocomposing machine so that the images thereon are precisely and accurately in registration with one another, without optically registering the chase, which comprises: providing a cross ruled glass plate adapted to receive at least two image-bearing sheets of said series in superposed relationship, said plate having indexing means whereby the orientation of said plate about an axis perpendicular to the plate and passing through the center of the plate, is unique; placing a first image-bearing sheet on said plate, said sheet being oriented in the manner in which the other sheets of the series are to be oriented; fixing the position of said sheet relative to said plate to preserve the exact position of said sheet relative to said plate during succeeding operations; superimposing a second image-bearing sheet over said first image bearing sheet and after the image thereon has been matched to register precisely with the first image, fixing the position of said sheet by the means used to fix the position of the first sheet; and repeating the process with the image-bearing sheets, one-at-a-time until all of the sheets of the series have been placed above the first image-bearing sheet; positioning the members of the series on a carrier adapted to convey said oriented image-bearing sheets to the chase, said carrier having means corresponding to an indexing means on said cross ruled glass plate, to preserve the unique orientation of said sheets and means to preserve the relative relationship of the members of said series; conveying the sheets to the chase and maintaining the sheets in the uniquely determined oriented position adjacent the chase in order that each sheet may be temporarily secured to the chase; and taping the sheets to the chase in the predetermined position, whereby each sheet is positioned on said chase in registry with each other sheet of the series.

2. A device for transferring a plurality of superimposed image-bearing sheets from a table whereon the sheets have been positioned relative to one another so that the images on said sheets are in registry with one another to a chase or negative holder in a photocomposing machine, to which the image-bearing sheets are to be taped, one at a time, while preserving the exact relative position existing between the members of said sheets, which device comprises: a rectangular frame having a generally rectangular configuration and adapted to convey an image-bearing sheet to a chase, and indexing means carried on said frame adjacent the four corners of said frame, each individual indexing means being offset from the diagonals of said rectangular frame so as to dispose said indexing means unsymmetrically about a central axis extending perpendicular to a plane passing through the corners of said frame; said indexing means being adapted to match similarly disposed indexing means on the chase of a photocomposing machine, whereby said device is permitted to be engaged by said chase only when oriented in a specific single way.

3. A device as in claim 2 wherein said device includes a pair of arms connecting the middle portions of opposite sides of said frame; each of said arms having cut-away portions defining slotted trackways extending along a portion of the length of said arms, pins slidably disposed in said trackways, and adapted to cooperate with means for fixing the position of an image-bearing sheet positioned thereon while they are being conveyed to a chase.

4. A device for effecting the positioning of a plurality of image-bearing sheets in superimposed relationship to one another and with the images on said sheets in registry with one another, said device comprising: a flat, translucent sheet having a generally rectangular configuration and being symmetrical about an axis of symmetry extending perpendicular to said sheet, passing through the intersection of diagonals connecting the corners of said sheet; and indexing means secured to and located adjacent each of the corners of said sheet, each of said indexing means consisting of an upstanding pin, offset from an extremity of a diagonal of said sheet by an amount which differs from the amount the remaining pins are offset from the diagonals of said sheet, whereby said pins are not symmetrically disposed about the axis of symmetry and constitute a means for determining the orientation of said sheet.

5. A masking sheet having apertures disposed so as to match the indexing means of the device of claim 4.

6. In a photocompositor, a chase having holes drilled on one surface thereof to match the indexing means of claim 4.

References Cited in the file of this patent

UNITED STATES PATENTS

| | | |
|---|---|---|
| 2,711,031 | Kessler | June 21, 1955 |
| 2,886,894 | Gutzmer | May 19, 1959 |
| 2,902,770 | Mulcahy | Sept. 8, 1959 |